US006961901B1

(12) United States Patent
Colson

(10) Patent No.: US 6,961,901 B1
(45) Date of Patent: Nov. 1, 2005

(54) SYSTEM FOR PRIORITIZING OF DOCUMENT PRESENTED ON CONSTRAINED RECEIVING STATION INTERFACES TO USERS OF THE INTERNET PERSONALIZED TO EACH USER'S NEEDS AND INTERESTS

(75) Inventor: James Campbell Colson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 750 days.

(21) Appl. No.: 09/240,496

(22) Filed: Jan. 29, 1999

(51) Int. Cl.[7] .............................................. G06F 15/00
(52) U.S. Cl. ...................... 715/526; 715/527; 715/517
(58) Field of Search ............................... 707/527, 526, 707/500, 501.1, 517; 715/526, 527, 500, 715/501.1, 517

(56) References Cited

U.S. PATENT DOCUMENTS

| 5,748,186 A | * | 5/1998 | Raman | 707/501 |
| 5,983,247 A | * | 11/1999 | Yamanaka et al. | 707/526 |
| 6,130,917 A | * | 10/2000 | Monroe | 375/295 |

* cited by examiner

Primary Examiner—Joseph Feild
Assistant Examiner—R. Singh

(74) Attorney, Agent, or Firm—Jerry Kraft; Mark S. Walker; Leslie Van Leuwen

(57) ABSTRACT

A process in a computer managed communication network such as the World Wide Web with user access via a plurality of data processor controlled interactive display stations and with a system for displaying documents, e.g. Web pages, transmitted to said display stations from locations remote from said stations which provides the user with a system for the prioritizing of documents presented on constrained receiving stations to users of the Internet in an order personalized to each user's needs and interests which have been heuristically determined based upon the user's past access to such documents through standard desktop interfaces. The user is enabled to interface with the received documents at receiving stations through devices which have greater interface functional constraints than a standard desktop display interface through a process comprising first presenting a plurality of types of received documents to a selected user through a device having a standard desktop display interface, then tracking the interactive activity of said selected user to said plurality of types of received documents and determining the priority of said types of received documents based upon said tracking, and presenting received documents of said plurality of types to said selected user through said devices having greater interface functional constraints in an order based upon said priority. The receiving devices with interfaces having functional constraints may be audible only interface devices, and displays of lesser dimensions or lower resolution than standard desktop displays. The network may be the Internet or World Wide Web. The documents involved may be electronic mail.

18 Claims, 4 Drawing Sheets

SYSTEM FOR PRIORITIZING OF DOCUMENT PRESENTED ON CONSTRAINED RECEIVING STATION INTERFACES TO USERS OF THE INTERNET PERSONALIZED TO EACH USER'S NEEDS AND INTERESTS

TECHNICAL FIELD

The present invention relates to computer managed communication networks, such as the World Wide Web or Internet, and particularly to ease of use of interactive computer controlled display interfaces to networks for users using a variety equipment of differing functionality to access the network.

BACKGROUND OF RELATED ART

The 1990's decade has been marked by a technological revolution driven by the convergence of the data processing industry with the consumer electronics industry. The effect has in turn driven technologies which have been known and available but relatively quiescent over the years. A major one of these technologies is the internet related distribution of documents, media and programs. The convergence of the electronic entertainment and consumer industries with data processing exponentially accelerated the demand for wide ranging communications distribution channels and the World Wide Web (Web) or Internet, which had quietly existed for over a generation as a loose academic and government data distribution facility, reached "critical mass" and commenced a period of phenomenal expansion. With this expansion, businesses and consumers have direct access to all matter of documents, media and computer programs. It is now possible for the Web browser or wanderer in reviewing Internet or Web search results to spend literally hours going through document after document often less than productive excursions through the Web. These excursions often strained the user's time and resources. In order for the Internet to mature to its great expectations to solid commercial fruition, it will be necessary for the Internet to greatly reduce its drain on time and related resources.

In this connection, regular users of the Internet encounter an additional significant problem, i.e., receiving information on a wide variety of equipment or receiving devices. In our highly mobile business pervasive computing paradigm where user "office" out of little more than their briefcase, it is more and more likely that a user will need to access his information from the Internet at many different receiving stations with associated computer devices having user interfaces of significantly differing functionality, i.e., differing device constraints. Most typical network transmitted documents including electronic mail have been created with the assumption that the user has a moderate to high resolution GUI, keyboard and mouse. Because of these assumptions, most network documents and applications have a look and feel presenting pull down menus and the use of differing fonts and a variety of colors to demark different areas of the interface; the available graphical interface real estate is completely utilized. This is implemented as most standard windows desktop interfaces as the standard for Internet documents, E-Mail and applications. However in our highly mobile business computing environment, many different form factors and device interfaces will be used to access documents and application off the Internet: some will have ¼ VGA displays; others, e.g., personal digital assistant will have small alphameric displays with a single font and pitch. Still others may have no visual interface at all but interface through audible output and speech recognition input. These and other non-conventional user interfaces provide less and less interface resource to the user, i.e., these device interfaces have a great many constraints. To access and sort received documents has been tedious enough with the comfort of high resolution standard desktop interfaces; constrained interfaces such as low resolution, two color or small dimension displays or audible only interfaces tends to make adequate user access almost impossible.

SUMMARY OF THE PRESENT INVENTION

The present invention overcomes these prior art problems by providing a system, method and program wherein the documents presented on constrained interfaces at receiving stations on network are prioritized so as to be presented to the user in an order personalized to each user's needs and interests which have been heuristically determined based upon the user's past access to such documents through standard desktop interfaces. The user is enabled to interface with the received documents at receiving stations through devices which have greater interface functional constraints than a standard desktop display interface through a process comprising first presenting a plurality of types of received documents to a selected user through a device having a standard desktop display interface, then tracking the interactive activity of said selected user to said plurality of types of received documents and determining the priority of said types of received documents based upon said tracking, and presenting received documents of said plurality of types to said selected user through said devices having greater interface functional constraints in an order based upon said priority. The receiving devices with interfaces having functional constraints may be audible only interface devices, and displays of lesser dimensions or lower resolution than standard desktop displays. The network may be the Internet or World Wide Web which are used interchangeably in the present description. The documents involved may be electronic mail.

In accordance with a further aspect of the present invention, means are provided for varying said prioritized order of received document presentation based upon the interface functional constraints of the receiving station device.

While the desktop environment provides the primary source for the heuristic monitoring of user activities as previously discussed, it should be understood that data involved in the use of even interfaces with constraints may still be monitored and thus contribute to the overall priority determination.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
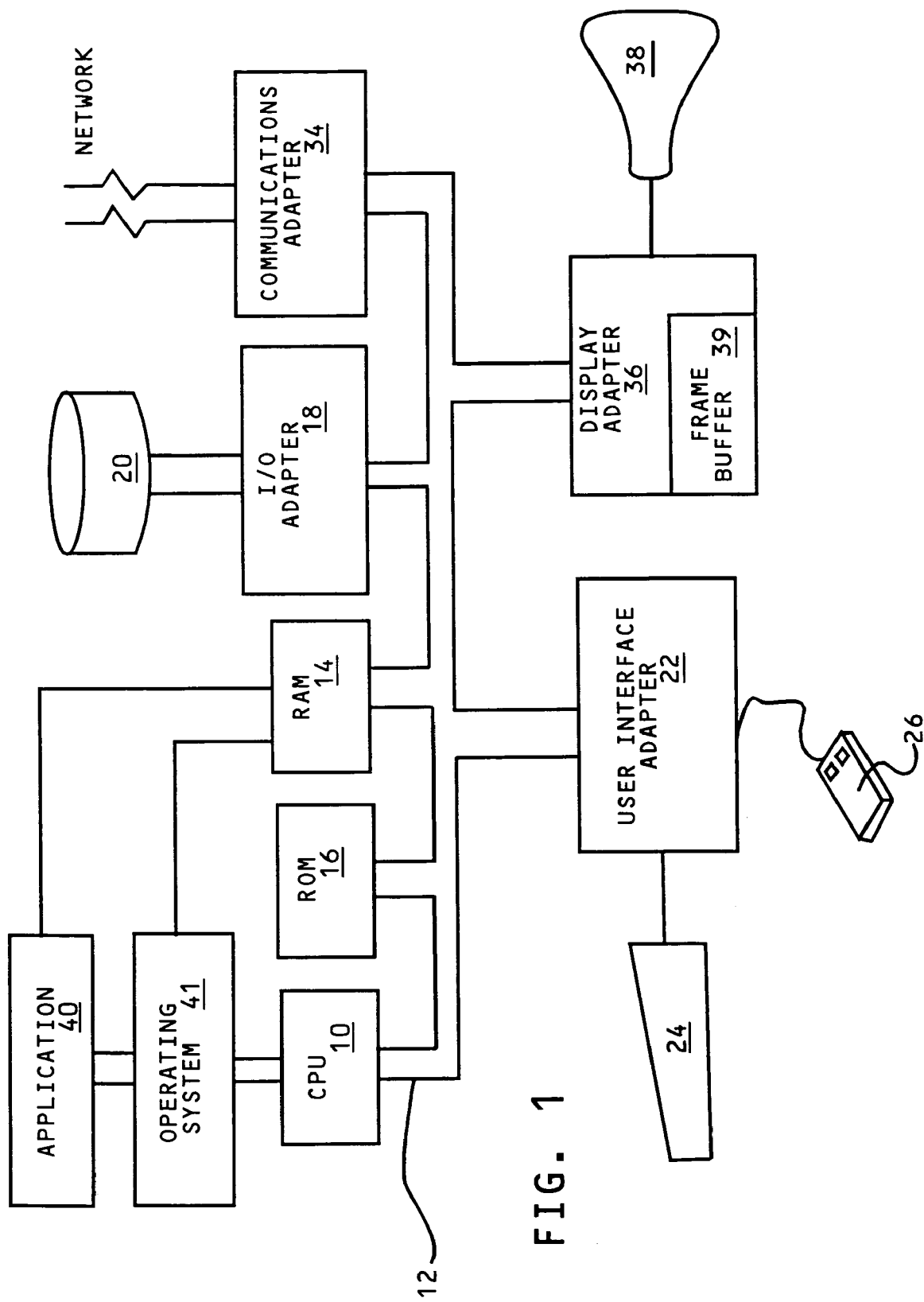
FIG. 1 is a block diagram of a data processing system including a central processing unit and network connections via a communications adapter which is capable of implementing the receiving display station on which the received Web page or Web document may be processed in accordance with the present invention.

Referring to FIG. 1, a typical data processing terminal is shown which may function as a computer controlled network receiving terminal used in implementing the present invention. The general functional elements of Fig. would be present in any receiving display terminal whether it be a high function computer on which full desktop interfaces may be implemented or a limited function terminal with user interface constraints. A central processing unit (CPU) 10, such as one of the PC microprocessors or workstations, e.g. RISC System/6000™ (RS/6000)—a high function display— (RISC System/6000 is a trademark of International Business Machines Corporation) series available from International Business Machines Corporation (IBM), is provided and interconnected to various other components by system bus 12. An operating system 41 runs on CPU 10, provides control and is used to coordinate the function of the various components of FIG. 1. Operating system 41 may be one of the commercially available operating systems such as the AIX 6000™ operating system or OS/2™ operating system available from IBM (AIX 6000 and OS/2 are trademarks of International Business Machines Corporation); Microsoft's Windows 95™ or Windows NT™, as well as UNIX and AIX operating systems. Application programs 40 controlled by the system are moved into and out of the main memory RAM 14. These programs include the program of the present invention to be subsequently described in combination with any conventional Web browser, such as the Netscape 3.0™ or Microsoft's Explorer™. However, as will be subsequently described, it is preferable that the program of the present invention be resident on the Web or Internet server through which the receiving station is connected to the Web. Read only memory (ROM) 16 is connected to CPU 10 via bus 12 and includes the basic input/output system (BIOS) that controls the basic computer functions. Random access memory (RAM) 14, I/O adapter 18 and communications adapter 34 are also interconnected to system bus 12. I/O adapter 18 may be a small computer system interface (SCSI) adapter that communicates with the disk storage device 20. Communications adapter 34 interconnects bus 12 with an outside network enabling the data processing system to communicate with other such systems over a local area network (LAN) or wide area network (WAN), which includes, of course, the World Wide Web or Internet. The latter two terms are meant to be generally interchangeable, and will be so used in the present description of the distribution network. I/O devices are also connected to system bus 12 via user interface adapter 22 and display adapter 36. Keyboard 24 and mouse 26 are all interconnected to bus 12 through user interface adapter 22. Display adapter 36 includes a frame buffer 39, which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24 or mouse 26 and receiving output information from the system via display 38.

Before going further into the details of specific embodiments, it will be helpful to understand from a more general perspective the various elements and methods which may be related to the present invention. Since a major aspect of the present invention is directed to documents, such as Web pages, transmitted over networks, an understanding of networks and their operating principles would be helpful. We will not go into great detail in describing the networks to which the present invention is applicable. Reference has also been made to the applicability of the present invention to a global network such as the Internet. For details on Internet nodes, objects and links, reference is made to the text, *Mastering the Internet*, G. H. Cady et al., published by Sybex Inc., Alameda, Calif., 1996.

Any data communication system which interconnects or links computer controlled systems with various sites defines a communications network. A network may be as simple as two linked computers or it may be any combination of LANs or WANs. Of course, the Internet or Web is a global network of a heterogeneous mix of computer technologies and operating systems. Higher level objects are linked to the lower level objects in the hierarchy through a variety of network server computers. These network servers are the key to network distribution such as the distribution of Web pages and related documentation. In this connection, the term documents as used to describe data transmitted over the World Wide Web or other networks is intended to include Web pages including displayable text, graphics and other images as well as programs and transmitted data files with moving images.

Figure 2:
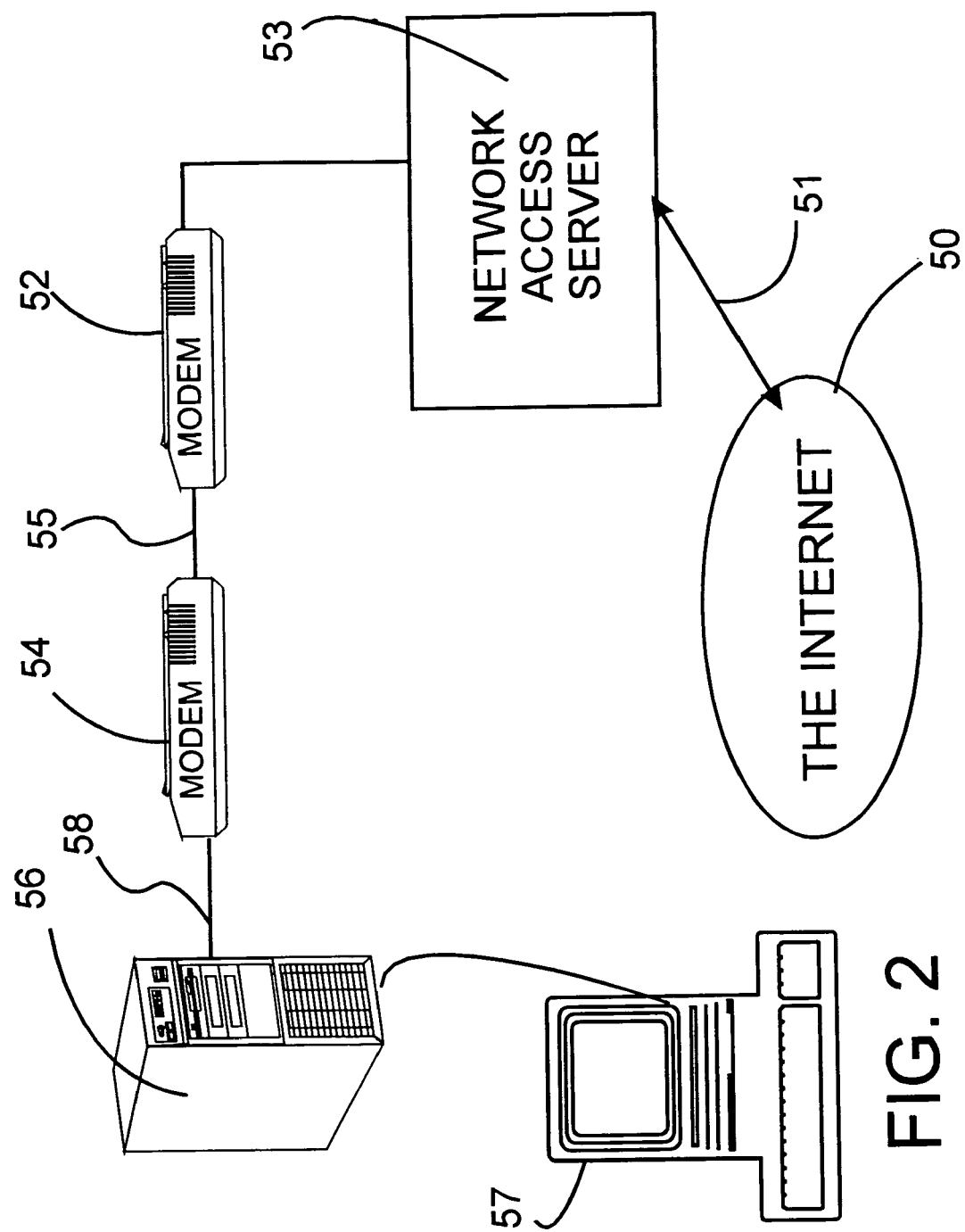
FIG. 2 is a generalized diagrammatic view of an Internet portion upon which the present invention may be implemented.

A generalized diagram of a portion of an Internet, which the computer 56 controlled display terminal 57 used for Web page or other document display of the present invention, is connected as shown in FIG. 2. Computer 56 and display terminal 57 are the computer system shown in FIG. 1 and connection 58 (FIG. 2) is the network connection shown in FIG. 1. Reference may be made to the above-mentioned *Mastering the Internet*, pp. 136–147, for typical connections between local display workstations to the Internet via network servers, any of which may be used to implement the system on which this invention is used. The system embodiment of FIG. 2 is one of these known as a host-dial connection. Such host-dial connections have been in use for over 30 years through network access servers 53 which are linked 51 to the Internet 50. The servers 53 are maintained by a service provider to the client's display terminal 57. The host's server 53 is accessed by the client terminal 57 through a normal dial-up telephone linkage 58 via modem 54, telephone line 55 and modem 52. The HTML files representative of the Web pages are downloaded to display terminal 57 through controlling server 53 and computer 56 via the telephone line linkages from server 53 which may have accessed them from the internet 50 via linkage 51. Computer 56 and display appear to formidable enough to provide a high resolution desktop display on which the desktop monitoring aspects of the present invention may be implemented. Likewise, a lower resolution and/or lesser dimensional display terminal such that in a laptop, palm-held or personal digital assistant may be substituted for computer/display 56/57 when the user personalized prioritized document presentation aspects of the present invention are carried out. For this reason, it is preferable to have the novel program of the present invention resident on the network access server 53 so that irrespective of the interface constraint functionality of the accessing receiving computer or its location, the same program and the attendant stored data relative to priority will be accessed in server 53.

Figure 3:
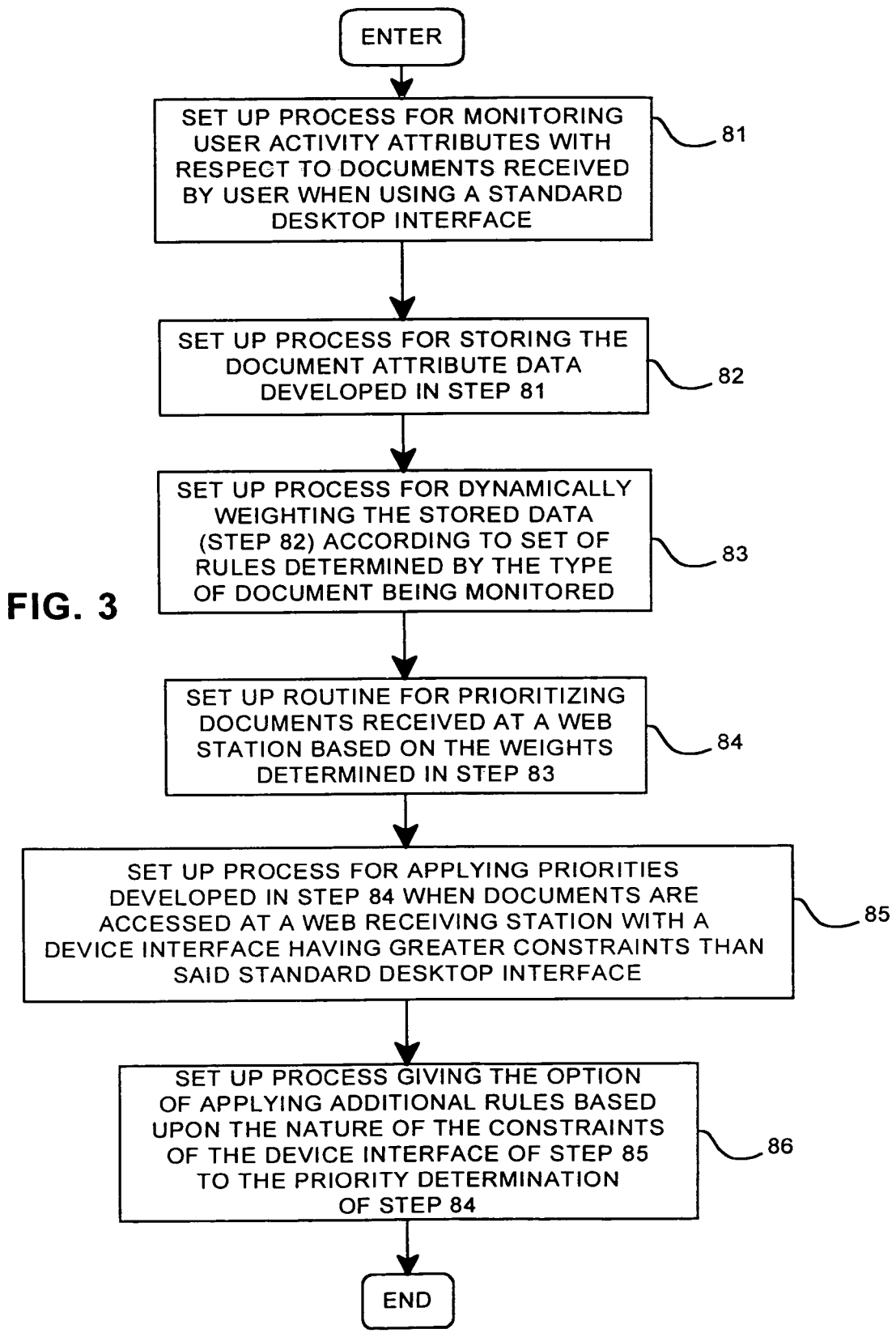
FIG. 3 is a general flowchart of a programming set up to implement the present invention for prioritizing of documents presented on constrained receiving station interfaces.
Figure 4:
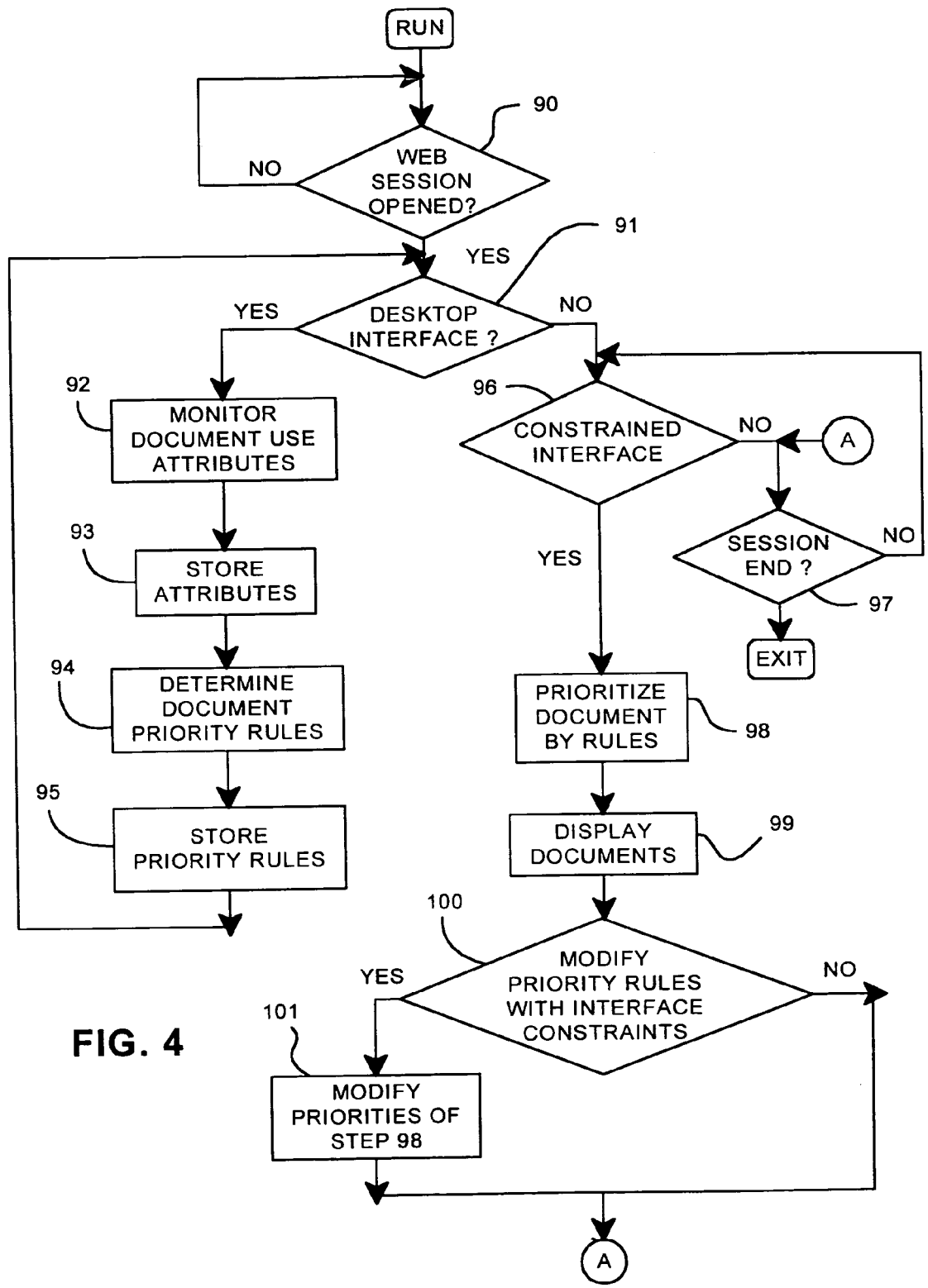
FIG. 4 is a flowchart of an illustrative run of the program set up in FIG. 3.

Now, with reference to FIGS. 3 and 4 we will describe a process implemented by the present invention in conjunction with the flowcharts of these figures. FIG. 3 is a flowchart showing the development of a process according to the present invention for the prioritizing of document presented on constrained receiving station interfaces to users of the Internet personalized to each user's needs and interests. With reference to FIG. 3, first, process step 81, there is set up a process for monitoring some predetermined attributes with respect to the user's handling of documents received on a standard desktop interface. This data is stored, step 82. Then, step 83, a process is set up for weighing the stored data according to a set of parameters and rules determined by the type of document being monitored. For example, data collected or monitored on the desktop interaction of a user with his E-Mail might determine elapsed time to respond:

E-mail message that have fewer addresses;
E-mail sourced by a certain set of addresses;
E-mail of greater or lesser length;
E-mail having certain keywords in their subject field.

In any event, step 84, a routine is set up for prioritizing the documents received at a web station based upon the weights determined in step 83. Then step 85, a process is set up for applying the priorities developed in step 84 when documents are accessed at a Web station with a device interface having greater constraints than said standard desktop interface. Finally, a process is set up, step 86, for providing optionally applied additional rules based upon the nature of the constraints of the device interface of step 85 to the priority determination of step 84. The running of the process will now be described with respect to FIG. 4. First, step 90, a determination is made, step 90 as to whether a Web session is opened, step 90. If No, the process loops back to step 90 where the opening of a Web session is awaited. If Yes, then step 91, a determination is made as to whether we have a standard desktop interface. If Yes, this gives us the opportunity to monitor the user's preferable use with respect to document attributes being monitored, step 92 and to store the attribute values, step 93, to use these values to determine document priority rules for the particular user, step 94, and to store such rules, 95. At this point, the process is returned to step 91 where a determination is made as to whether the desktop environment has continued. If the decision from step 91 is No, then a determination made as to whether we have one of the constrained user interfaces, step 96; if Yes, then the received documents are prioritized, step 98, according to the prioritized rules personalized to the user's needs and interests, and stored in step 95, and the documents are displayed or otherwise output in the prioritized order, step 99. It was previously mentioned that the priority rules (of step 95) may be optionally modified to particularly suit or conform to the interface constraints of particular devices. In step, 100, a determination is made as to whether such a modification is provided for. If Yes, then such a modification is provided for, step 101. At this point or if the decision from step 100 is No, then the process returns to decision step 97 via branch "A". In this connection, if the decision from step 96 had been No, the process would also have proceeded to decision step 97 where a determination is made as to whether the session is over. If Yes, then the session is exited. If No, then the process returns to decision step 96, and the process is continued from there as previously described.

One of the preferred implementations of the present invention is as a routine in an operating system made up of programming steps or instructions resident in RAM 14, FIG. 1, during computer operations or in the RAM of network server 53, FIG. 2. Until required by the computer system, the program instructions may be stored in another readable medium, e.g. a disk drive, or in a removable memory such as an optical disk for use in a CD-ROM computer input or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a computer managed communication network with user access via a plurality of data processor controlled interactive receiving stations and with a system for presenting documents transmitted to said receiving stations from locations remote from said stations, a method for enabling a user to interface with said documents at said receiving stations through display devices having greater interface functional constraints than a standard desktop personal computer display interface including lesser dimensions than said standard desktop personal computer interface comprising:

presenting a plurality of types of received documents to a selected user through a device having a standard desktop personal computer display interface, tracking the interactive activity of said selected user to said plurality of types of received documents, determining the priority of said types of received documents based upon said tracking, and presenting received documents of said plurality of types to said selected user through said devices each having lesser dimensions than said standard desktop personal computer interface in an order based upon said priority.

2. The method of claim 1 wherein said device having greater interface functional constraints through which received documents are presented to said user has an audible interface.

3. The method of claim 1 wherein said device having greater interface functional constraints though which received documents are presented to said user has a display interface of lower resolution than said standard desktop display interface.

4. The method of claim 1 including the step of further varying said prioritized order of received document presentation based upon the interface functional constraints of the receiving station device.

5. The method of claim 1 wherein said communication network is the Internet.

6. The method of claim 5 wherein said received documents are types of electronic mail, said types being determined by attributes of said mail.

7. In a computer managed communication network with user access via a plurality of data processor controlled interactive receiving stations and with a system for presenting documents transmitted to said receiving stations from locations remote from said stations, apparatus for enabling a user to interface with said documents at said receiving stations through display devices having greater interface functional constraints than a standard desktop personal computer display interface including lesser dimensions than said standard desktop personal computer interface comprising:

means for presenting a plurality of types of received documents to a selected user through a device having a standard desktop personal computer display interface, means for tracking the interactive activity of said selected user to said plurality of types of received documents, means for determining the priority of said types of received documents based upon said tracking, and means for presenting received documents of said plurality of types to said selected user through said devices each having lesser dimensions than said standard desktop personal computer interface in an order based upon said priority.

8. The communication network of claim 7 wherein said device having greater interface functional constraints through which received documents are presented to said user has an audible interface.

9. The communication network of claim 7 wherein said device having greater interface functional constraints though which received documents are presented to said user has a display interface of lower resolution than said standard desktop display interface.

10. The communication network of claim 7 further including means for varying said prioritized order of received document presentation based upon the interface functional constraints of the receiving station device.

11. The communication network of claim 7 wherein said network is the Internet.

12. The communication network of claim 11 wherein said received documents are types of electronic mail, said types being determined by attributes of said mail.

13. A computer program for a computer managed communication network with user access via a plurality of data processor controlled interactive receiving stations and with a system for presenting documents transmitted to said receiving stations from locations remote from said stations, said program having code recorded on a computer readable medium for enabling a user to interface with said documents at said receiving stations through display devices having greater interface functional constraints than a standard desktop personal computer display interface including lesser dimensions than said standard desktop personal computer interface comprising:

means for presenting a plurality of types of received documents to a selected user through a device having a standard desktop personal computer display interface, means for tracking the interactive activity of said selected user to said plurality of types of received documents, means for determining the priority of said types of received documents based upon said tracking, and means for presenting received documents of said plurality of types to said selected user through said devices each having lesser dimensions than said standard desktop personal computer interface in an order based upon said priority.

14. The computer program of claim 13 wherein said device having greater interface functional constraints through which received documents are presented to said user has an audible interface.

15. The computer program of claim 13 wherein said device having greater interface functional constraints though which received documents are presented to said user has a display interface of lower resolution than said standard desktop display interface.

16. The computer program of claim 13 further including means for varying said prioritized order of received document presentation based upon the interface functional constraints of the receiving station device.

17. The computer program of claim 13 wherein said network is the Internet.

18. The computer program of claim 17 wherein said received documents are types of electronic mail, said types being determined by attributes of said mail.

* * * * *